(12) United States Patent
Ikeyama

(10) Patent No.: US 8,022,879 B2
(45) Date of Patent: Sep. 20, 2011

(54) ANTENNA STRUCTURE FOR WIRELESS COMMUNICATION DEVICE

(75) Inventor: Masahiro Ikeyama, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 587 days.

(21) Appl. No.: 12/120,168

(22) Filed: May 13, 2008

(65) Prior Publication Data

US 2008/0284659 A1    Nov. 20, 2008

(30) Foreign Application Priority Data

May 18, 2007  (JP) .................................. 2007-133259

(51) Int. Cl.
    *H01Q 1/38* (2006.01)
(52) U.S. Cl. ................. 343/700 MS; 343/866; 343/895; 343/711; 343/718
(58) Field of Classification Search .......................... None
    See application file for complete search history.

(56) References Cited

U.S. PATENT DOCUMENTS

| 5,999,409 | A  | * | 12/1999 | Ando et al. .................. 361/737 |
| 6,421,015 | B1 | * | 7/2002 | Chen ...................... 343/700 MS |
| 6,424,315 | B1 | * | 7/2002 | Glenn et al. .................. 343/895 |
| 6,680,702 | B2 | * | 1/2004 | Yde-Andersen et al. ...................... 343/700 MS |
| 7,268,741 | B2 | * | 9/2007 | Sarabandi et al. ............ 343/866 |
| 2002/0027531 | A1 | * | 3/2002 | Brown et al. ................. 343/895 |
| 2005/0136852 | A1 | * | 6/2005 | Nakagawa et al. .......... 455/90.3 |
| 2007/0176845 | A1 | * | 8/2007 | Yamazaki et al. ............. 343/895 |
| 2008/0284659 | A1 | * | 11/2008 | Ikeyama ................ 343/700 MS |
| 2010/0073130 | A1 | * | 3/2010 | Tsuruta .......................... 340/5.8 |

FOREIGN PATENT DOCUMENTS

| JP | 07-113365 | 5/1995 |
| JP | 09-071189 | 3/1997 |
| JP | 2000-114992 | 4/2000 |
| JP | 2004-236273 | 8/2004 |
| JP | 2004-363929 | 12/2004 |
| JP | 2005-109609 | 4/2005 |

* cited by examiner

*Primary Examiner* — Trinh V Dinh (74) *Attorney, Agent, or Firm* — Patterson Thuente Christensen Pedersen, P.A.

(57) ABSTRACT

An antenna structure for a wireless communication device including a substrate having a first surface that supports an electronic component and a second surface opposite to the first surface. The antenna structure includes a first surface pattern formed on the first surface of the substrate. A second surface pattern is formed on the second surface of the substrate. The second surface pattern is at least partially separated from the first surface pattern in a direction perpendicular to a thicknesswise direction of the substrate.

13 Claims, 4 Drawing Sheets

ANTENNA STRUCTURE FOR WIRELESS COMMUNICATION DEVICE

RELATED APPLICATIONS

This application is based upon and claims the benefit of Japanese Application 2007-133259 filed on May 18, 2007, the contents of which are incorporated herein by reference.

BACKGROUND OF THE INVENTION

The present invention relates to an antenna structure for a wireless communication device.

Nowadays, many vehicles are equipped with a hands-free system to improve vehicle operation convenience. For example, a hands-free system locks and unlocks vehicle doors, enables the engine to be started, and actually starts the engine. Such type of a hands-free system includes a low frequency (LF) transmitter and a radio frequency (RF) receiver, which are arranged in a vehicle. The hands-free system communicates with a portable device, which is carried by a user (driver) and functions as a key. The LF transmitter intermittently transmits a request signal in a low frequency band. In response to the request signal, the portable device returns an ID code signal in a radio frequency band. The ID code signal includes an identification (ID) code that is unique to the portable device, or key. The RF receiver receives the ID code signal. Then, the ID code of the portable device is compared with an ID code of the vehicle. When the ID codes match, the portable device is verified as being authentic. In such a case, the vehicle doors can be locked or unlocked, the starting of the engine is enabled, and the engine may actually be started.

Such type of a portable device incorporates a receiving antenna, which receives the request signal transmitted from the vehicle, and a transmitting antenna, which transmits to the vehicle the ID code signal that is unique to the key, in order to perform wireless communication. One example of an antenna used in a portable device is a pattern antenna. The pattern antenna is formed by printing the pattern of an antenna onto a substrate that supports wireless communication components of the portable device (refer to, for example, Japanese Laid-Open Patent Publication No. 7-113365). The use of a pattern antenna, which is printed on a substrate, eliminates the need for separate antenna components that are independent from the substrate. Thus, the portable device may be formed with fewer components.

The human body may block radio waves when the portable device is performing wireless communication. The portable device is often carried by a user in a clothing pocket. In such a state, the portable device would be in substantial contact with the human body. Thus, the human body may interfere with the portable device and lower the intensity of transmitted radio waves. Thus, even if the pattern antenna of the portable device attempts to transmit a signal to the vehicle, the transmitted radio wave may not reach the vehicle in a normal manner due to the lowered intensity of the transmitted radio waves. In such a case, the portable device would not be able to communicate radio waves with the vehicle in a normal manner. Thus, the portable device would not function normally and the user would not be able to perform the desired vehicle operation even though the user is carrying the portable device. Such a situation would be annoying to the user. The same problem may occur when the user performs a vehicle operation while gripping the portable device such that the pattern antenna is blocked by the user's hand.

SUMMARY OF THE INVENTION

It is an object of the present invention to provide an antenna structure for a wireless communication device that improves the wireless communication capability.

One aspect of the present invention is an antenna structure for a wireless communication device including a substrate having a predetermined thickness, a first surface that supports an electronic component, and a second surface opposite to the first surface. The antenna structure includes a first surface pattern formed on the first surface of the substrate. A second surface pattern is formed on the second surface of the substrate. The second surface pattern is at least partially separated from the first surface pattern in a direction perpendicular to a thicknesswise direction of the substrate.

A further aspect of the present invention is a wireless key for performing wireless communication with a communication subject. The wireless key includes an operation unit which generates a wireless signal when operated by a user. A substrate is connected to the operation unit and supports an electronic component. An antenna is printed onto the substrate and is capable of transmitting the wireless signal. The substrate includes a predetermined thickness, a first surface that supports the electronic component, and a second surface opposite to the first surface. The antenna includes a first surface pattern formed on the first surface of the substrate and a second surface pattern formed on the second surface of the substrate. The second surface pattern is at least partially separated from the first surface pattern in a direction perpendicular to a thicknesswise direction of the substrate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of an antenna structure for a wireless communication device according to a preferred embodiment of the present invention will now be discussed with reference to FIGS. 1 to 5.

Figure 1:
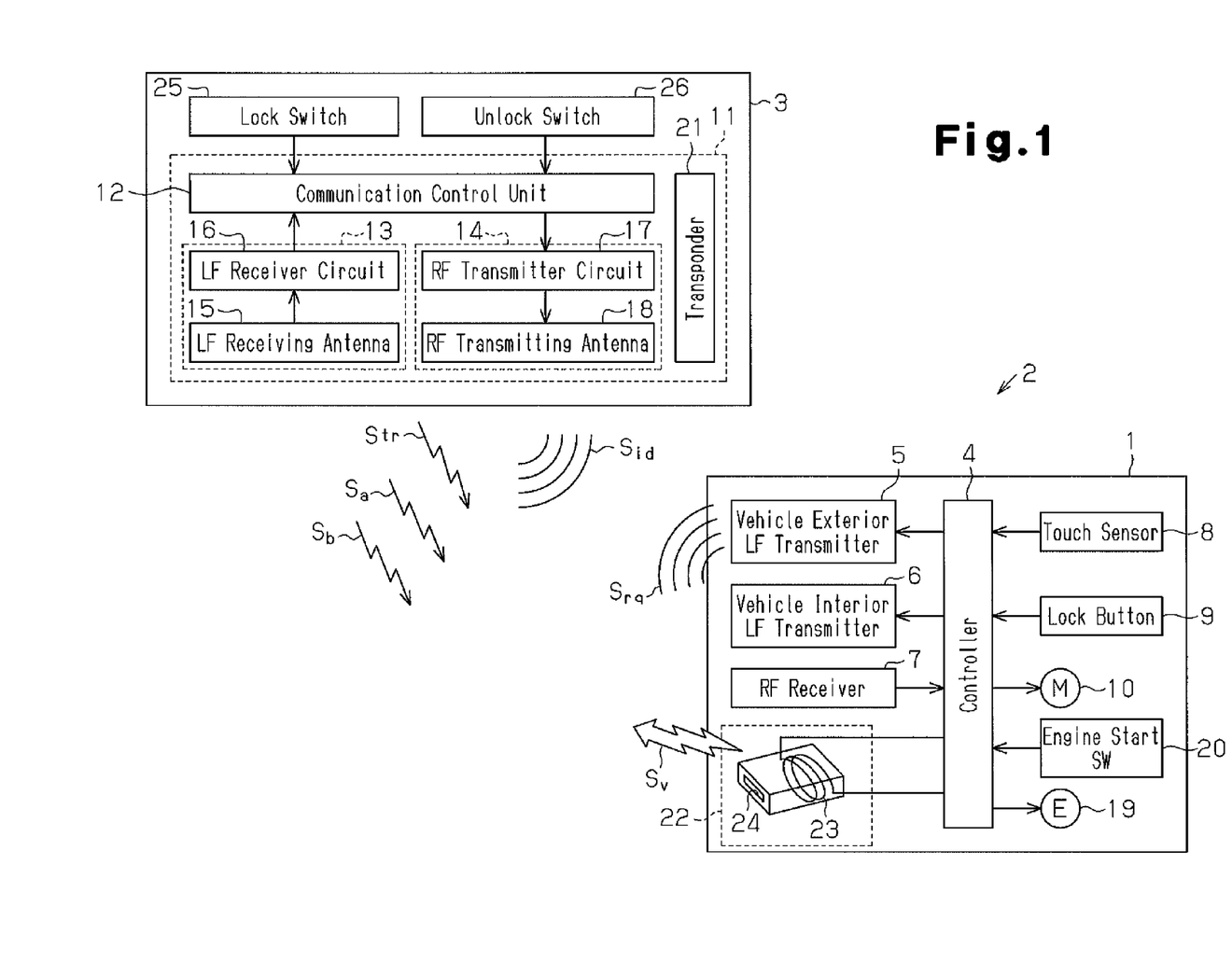
FIG. 1 is a block diagram schematically showing the structure of a hands-free system according to a preferred embodiment of the present invention.

Referring to FIG. 1, a vehicle 1 is equipped with a hands-free system 2, which locks or unlocks the vehicle doors and starts the engine without the need for performing an operation with a key. The hands-free system 2 transmits a request signal Srq from the vehicle 1. In response to the request signal Srq, a portable device 3 returns an ID code signal Sid, which includes an ID code of the portable device 3. When the ID code of the portable device 3 and an ID code of the vehicle 1 match, the vehicle doors can be locked or unlocked, the starting of the engine is enabled, and the engine may actually be started. The portable device 3 functions as a wireless communication device.

The hands-free system 2 includes a controller 4, which is located in the vehicle 1 and used to centrally control the hands-free system 2. The controller 4 is connected to a vehicle exterior LF transmitter 5, a vehicle interior LF transmitter 6, and a RF receiver 7. The vehicle exterior LF transmitter 5 is installed in a vehicle door or the like to transmit a signal in a low frequency (LF) band. The vehicle interior LF transmitter 6 is installed in the vehicle floor or the like to transmit a signal in the LF band within the passenger compartment. The RF receiver 7 is arranged in a rearview mirror or the like to receive a signal in a radio frequency (RF) band. The LF transmitter 5 is capable of transmitting the request signal Srq to an exterior communication range formed around the vehicle 1. The interior LF transmitter 6 is capable of transmitting the request signal Srq to an interior communication range formed in the passenger compartment.

The controller 4 is also connected to a touch sensor 8 arranged, for example, in an outer door handle or the like. The touch sensor detects when a user (driver) touches the door handle to unlock the vehicle door. A door lock button 9, which may be arranged in the door handle, is connected to the controller 4. The lock button 9 is pushed when the user locks the vehicle door. The controller 4 is also connected to a door lock motor 10, which is used as a drive source for driving a lock when locking or unlocking the vehicle door.

The portable device 3 incorporates a wireless communication mechanism 11 for performing wireless communication, which is in accordance with the hands-free system, with the vehicle 1. The wireless communication mechanism 11 includes a communication control unit 12, an LF receiver 13, and an RF transmitter 14. The LF receiver 13 receives a signal in the LF band, and the RF transmitter 14 transmits a signal in the RF band. The LF receiver 13 includes an LF receiving antenna 15, which receives a signal in the LF band, and an LF receiver circuit 16, which demodulates the received signal and sends the demodulated signal as reception data to the communication control unit 12. The RF transmitter 14 includes an RF transmitter circuit 17, which modulates communication data from the communication control unit 12, and an RF transmitting antenna 18, which transmits an ID code signal Sid including an identification (ID) code unique to the portable device 3. The communication control unit 12, the LF receiving antenna 15, the LF receiver circuit 16, and the RF transmitter circuit 17 are electronic components.

When the vehicle 1 is in a parked state (i.e., the engine is stopped and the vehicle doors are locked), the controller 4 intermittently transmits the request signal Srq, which is in the LF band, from the vehicle exterior LF transmitter 5 so as to form the exterior communication range near the vehicle 1. When the portable device 3 enters the exterior communication range and the LF receiver 13 receives the request signal Srq, the portable device 3 responds to the request signal Srq by returning the ID signal Sid, which includes the ID code, in the RF band from the RF transmitter 14. When the RF receiver 7 receives the ID signal Sid, the controller 4 compares the ID code of the portable device 3 with an ID code registered in the controller 4 to perform ID verification (vehicle exterior verification). When vehicle exterior verification is established, the controller 4 recognizes the verification establishment by setting a vehicle exterior verification establishment flag in an internal memory. Then, the controller 4 activates the touch sensor 8. In a state in which vehicle exterior verification is established, when the touch sensor 8 detects the outer door handle being touched, the controller 4 drives the door lock motor 10 to unlock the vehicle door.

When the vehicle 1 is in a still state (i.e., the engine is stopped and the vehicle doors are unlocked), the controller 4 transmits the request signal Srq from the vehicle exterior LF transmitter 5 when detecting that the lock button 9 has been pushed. As the portable device 3 returns the ID signal Sid in response to the request signal Srq, and the controller 4 recognizes the establishment of vehicle exterior verification, the controller 4 drives the door lock motor 10 and locks the vehicle doors.

The controller 4 is connected to an engine 19, which functions as a drive source for driving the vehicle 1, and an engine start switch 20, which is operated to start the engine 19. The engine start switch 20 also activates in-vehicle accessories. When the vehicle doors are unlocked after the establishment of vehicle exterior verification, the controller 4 determines that the driver has entered the vehicle upon detection of the opening of a vehicle door by, for example, a courtesy switch (not shown). In this case, the controller 4 transmits the request signal Srq from the vehicle interior LF transmitter 6 so as to form the interior communication range in the passenger compartment. As the portable device 3 enters the vehicle interior communication range, the RF receiver 7 receives the ID signal Sid, which is transmitted in response to the request signal Srq. Then, the controller 4 compares its own ID code with the ID code of the portable device 3 to perform ID verification (vehicle interior verification). When vehicle interior verification is established, the controller 4 recognizes the verification establishment by setting a vehicle interior verification establishment flag in an internal memory. When the driver operates the engine start switch 20 to start the engine 19 while depressing the brake pedal, the controller 4 checks the vehicle interior verification result. If vehicle interior verification has been established, the controller 4 actives various relays, such as an ACC relay or an ignition (IG) relay. Then, the controller 4 initiates ignition control and fuel injection control to start the engine 19.

The vehicle 1 includes an immobilizer system 22, which performs ID verification through wireless communication with the use of a transponder 21, which is arranged in the portable device 3. The immobilizer system 22 includes a transponder key coil 23, which is arranged in the vehicle 1 to function as an antenna when performing transponder communication with the portable device 3. The transponder key coil 23 is located near the steering wheel in a receptacle 24, which is for receiving the portable device 3. Further, the transponder key coil 23 is connected to the controller 4. When the portable device 3 is inserted into the receptacle 24, the immobilizer system 22 generates a drive radio wave Sv with the transponder key coil 23. This drives the transponder 21, which transmits a transponder code signal Str including a code number. The immobilizer system 22 compares the code number from the transponder 21 with its own code number to perform ID verification.

The controller 4 checks whether or not vehicle interior verification has been established before starting the engine 19 when detecting that the engine start switch 20 has been operated while the driver is depressing the brake pedal. In other words, the controller 4 performs ID verification with the hands-free system 2. However, the ID verification is not limited in such a manner. For example, battery drainage may occur in the portable device 3. Therefore, the controller 4 may determine that vehicle interior verification has been established when at least either one of the ID verification with the hands-free system 2 and the ID verification with the immobilizer system 22 is satisfied.

When including a wireless key function, the portable device 3 has a lock switch 25 and an unlock switch 26. The lock switch 25 is operated to lock the doors of the vehicle 1, and the unlock switch 26 is operated to unlock the doors of the vehicle 1. When determining that the lock switch 25 has been pushed, the communication control unit 12 transmits a lock request signal Sa, which includes a lock request and an ID code unique to the portable device 3, in the RF band to lock the doors of the vehicle 1. Further, when determining that the unlock switch 26 has been pushed, the communication control unit 12 transmits an unlock request signal Sb, which includes an unlock request and an ID code unique to the portable device 3, in the RF band to lock the doors of the vehicle 1. The lock switch 25 and unlock switch 26 form an operation unit.

Figure 2:
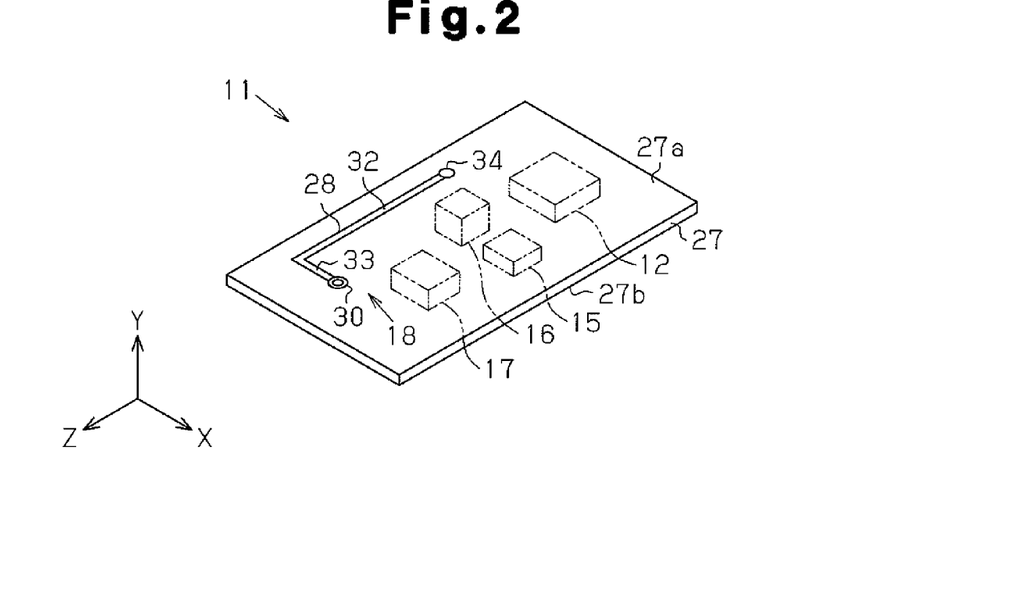
FIG. 2 is a perspective view showing a substrate arranged in a portable device.

Referring to FIG. 2, the wireless communication mechanism 11 includes a substrate 27, which supports various electronic components related to the wireless communication mechanism 11. The substrate 27 is a flat rectangular plate and has a first surface 27a (upper surface as viewed in FIG. 2). The first surface 27a supports the components related to the wireless communication mechanism 11, such as the communication control unit 12, the LF receiving antenna 15, the LF receiver circuit 16, and the RF transmitter circuit 17. Additionally, the first surface 27a supports switch contact circuits, such as the lock switch 25 and the unlock switch 26.

The LF receiving antenna 15 is a three-dimensional antenna and is formed by an antenna component independent from the substrate 27. Such type of a three-dimensional antenna is formed by winding an antenna wire in or around a bobbin. The bobbin is fixed to the substrate 27 in a state in which connection terminals (+terminal and −terminal) are electrically connected to the substrate 27. The LF receiving antenna 15 includes a total of three antenna wires defining three antenna axes, namely, the X antenna axis, Y antenna axis, and Z antenna axis. Accordingly, the LF receiving antenna 15 is capable of receiving radio waves transmitted from the vehicle 1 (i.e., request signal Srq) in the directions of the three antenna axes. When the LF receiving antenna 15 is such a three-axis antenna, the three-dimensional antenna may be formed by independent antenna bobbins, one for each axis, or a single antenna bobbin shared by the plural axes.

Figure 3A:
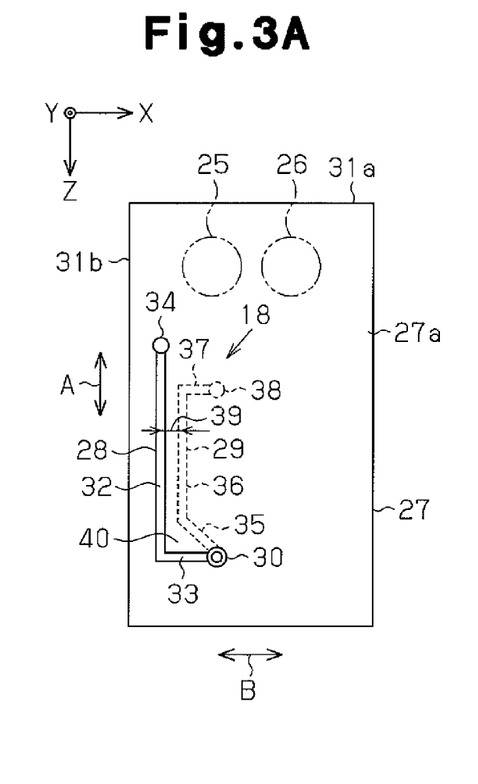
FIG. 3A is a plan view showing a first surface of the substrate.
Figure 3B:
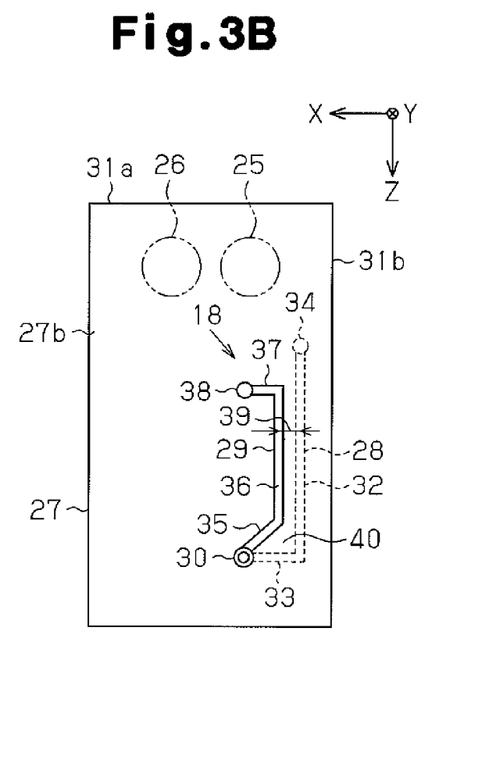
FIG. 3B is a plan view showing a second surface of the substrate.
Figure 4:
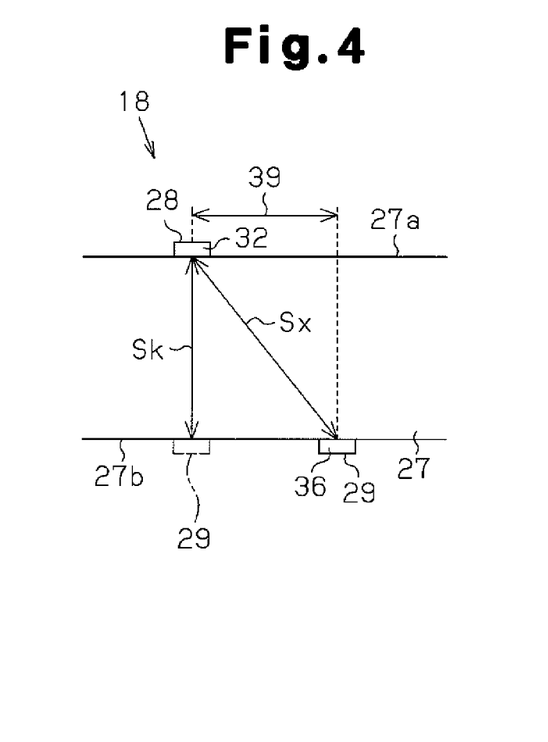
FIG. 4 is schematic diagram showing a clearance formed 5 in a pattern antenna.
Figure 5:
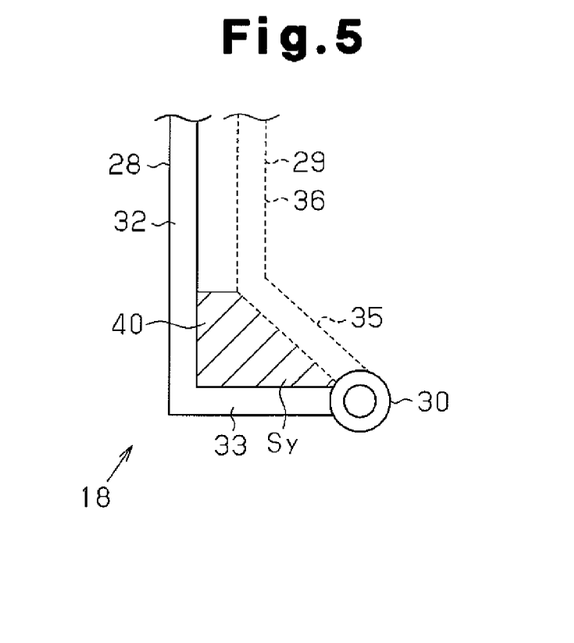
FIG. 5 is a schematic diagram showing another clearance formed in the pattern antenna.

Referring to FIGS. 2 and 3, the RF transmitting antenna 18 is a pattern antenna, which is formed by directly printing a metal plate, or antenna wire, directly onto the substrate 27. Referring to FIGS. 3A and 3B, in this example, the RF transmitting antenna 18 is a dual-layer wiring laid out on two opposite surfaces, namely, first and second surfaces 27a and 27b, of the substrate 27. The part of the pattern antenna laid out on the first surface 27a of the substrate 27 is defined as the first surface pattern 28, and the part of the pattern antenna laid out on the second surface 27b of the substrate 27 is defined as the second surface pattern 29. The first surface pattern 28 and the second surface pattern 29 are connected to each other by a through hole 30, which extends through the substrate 27.

The first surface pattern 28 is arranged near one of the four sides of the substrate 27. In this example, among the four sides of the substrate 27, side 31a is the one that is closest to the lock switch 25 and the unlock switch 26. Side 31b extends from one end of side 31a (in FIG. 3A, from the left end of side 31a). The first surface pattern 28 is arranged near side 31b. Further, the first surface pattern 28, which is generally L-shaped, includes a long first pattern portion 32, which extends in the longitudinal direction of the substrate 27 (direction indicated by arrow A in FIG. 3A), and a short second pattern portion 33, which extends in the lateral direction of the substrate 27 (direction indicated by arrow B in FIG. 3A). The second pattern portion 33 is formed to extend generally at a right angle from one end of the first pattern portion 32. The end of the first surface pattern 28 located on the first pattern portion 32 is connected to a power source (not shown) and functions as a power supply point 34. The other end of the first surface pattern 28 located on the second pattern portion 33 is connected to the through hole 30.

In the same manner as the first surface pattern 28, the second surface pattern 29 is arranged near one side of the substrate 27. In this example, the first and second surface patterns 28 and 29 are arranged near the same side of the substrate 27. The second surface pattern 29 includes a third pattern portion 35, a fourth pattern portion 36, and a fifth pattern portion 37. The third pattern portion 35 extends from the through hole 30 and is inclined relative to the lateral direction of the substrate 27. More specifically, the third pattern portion 35 is inclined at an acute angle relative to the second pattern portion 33 of the first surface pattern 28. The fourth pattern portion 36 extends parallel to the first pattern portion 32 at a location separated from the first pattern portion in a direction perpendicular to a thicknesswise direction, or the lateral direction, of the substrate 27. The fifth pattern portion 37 extends generally at a right angle from the fourth pattern portion 36 for a short distance toward the side that is opposite to side 31b. The end of the second surface pattern 29 on the fifth pattern portion 37 is connected to a ground point 38.

In the RF transmitting antenna 18, the first pattern portion 32 on the first surface 27a of the substrate 27 and the fourth pattern portion 36 on the second surface 27b of the substrate 27 are laid out so as to form a clearance 39 therebetween in the lateral direction of the substrate 27. Magnetic flux passes through the clearance 39 between the first and fourth pattern portions 32 and 36 when the RF transmitting antenna 18 transmits a signal. Accordingly, radio waves passing through the clearance 39 are generally directed in the direction of the X axis. The first and fourth pattern portions 32 and 36 are spaced from each other in the lateral direction of the substrate 27 and thereby do not overlap each other in the thicknesswise direction of the substrate 27.

In the RF transmitting antenna 18, the third pattern portion 35 on the second surface 27b of the substrate 27 extends inclined at a predetermined angle relative to the second pattern portion 33 on the first surface 27a of the substrate 27. The predetermined angle is an acute angle and less than 90 degrees. Further, the second pattern portion 33 and the third pattern portion 35 are laid out so as to form a clearance 40 therebetween. Magnetic flux passes through the clearance 40 between the second and third pattern portions 33 and 35 when the RF transmitting antenna 18 transmits a signal. Accordingly, radio waves passing through the clearance 40 are generally directed in the direction of the Y axis. The second pattern portion 33 and the third pattern portion 35 do not overlap each other in the thicknesswise direction of the substrate 27.

In this manner, the RF transmitting antenna 18 has an X axis antenna component due to the first and fourth pattern portions 32 and 36 and a Y axis antenna component due to the second and third pattern portions 33 and 35. Accordingly, the RF transmitting antenna 18 functions as a two-axis antenna and generally transmits the ID signal Sid in two axial directions, namely, the directions of the X and Y axes.

The X axis antenna component of the RF transmitting antenna 18 is produced by separating the first pattern portion 32 on the first surface 27a of the substrate 27 from the fourth pattern portion 36 on the second surface 27b of the substrate 27 so as to form the clearance 39. As a result, referring to FIG. 4, the clearance 39 through which magnetic flux passes has an area Sx that is greater than an area Sk, which would be obtained if the first and fourth patterns 32 and 36 were to be overlapped in the thicknesswise direction of the substrate 27. Accordingly, more radio wave components are directed in the direction of the X axis. This improves the antenna characteristics of the RF transmitting antenna 18 in the X axis direction.

The Y axis antenna component of the RF transmitting antenna 18 is produced by forming the clearance 40 between the second and third pattern portions 33 and 35. As a result, referring to FIG. 5, the clearance 40 through which magnetic flux passes has a significantly large area Sy. Accordingly, more radio wave components are directed in the direction of the Y axis. This improves the antenna characteristics of the RF transmitting antenna 18 in the Y axis direction.

In this manner, the RE transmitting antenna 18 transmits radio waves in the direction of two axes, the X axis and the Y axis. Thus, the request signal Srq is transmitted in the directions of multiples axes. This widens the radio wave transmission range in comparison to when radio waves are transmitted in the direction of a single axis. Accordingly, the RF transmitting antenna 18 has a high antenna capability. Further, the clearance 39 between the first and fourth pattern portions 32 and 36 produces the X axis antenna component, and the clearance 40 between the second and third pattern portions 33 and 35 produces the Y axis antenna component. Thus, the RF transmitting antenna 18 has antenna characteristics produced in the direction of two axes, and the radio wave intensity is high for each axis. This increases the antenna capability of the RF transmitting antenna 18 to a significantly high level.

The portable device 3 may be carried in a clothing pocket by a user such that it would sometimes be in substantial contact with the human body. In such a state, if the portable device 3 comes into substantial contact with the human body when the portable device 3 is performing wireless communication with the vehicle 1, this may attenuate the generated radio waves. However, the clearances 39 and 40 formed in the pattern antenna, or the RF transmitting antenna 18, increases the intensity of the radio waves generated by the portable device 3. This prevents the radio wave intensity of the portable device 3 from becoming too low. Further, communication errors are prevented from occurring when the portable device 3 is performing wireless communication with the vehicle 1 even if the portable device 3 in being held within a user's hand. Thus, the wireless communication capability of the portable device 3 is increased.

The preferred and illustrated embodiment has the advantages described below.

(1) The RF transmitting antenna 18 is formed by laying out a pattern antenna on the first and second surfaces 27a and 27b of the substrate 27. The first and fourth pattern portions 32 and 36 are spaced apart in the direction perpendicular to the thicknesswise direction of the substrate 27 to form the clearance 39 that produces the X axis antenna component of the RF transmitting antenna 18. The second and third pattern portions 33 and 35 are laid out to form the clearance 40 that produces the Y axis component of the RF transmitting antenna 18. This significantly improves the antenna performance of the RF transmitting antenna 18, which is a two-axis antenna, and increases the intensity of the radio waves generated by the RF transmitting antenna 18. Thus, when the portable device 3 performs communication with the vehicle 1, errors are prevented from occurring during wireless communication. This increases the wireless communication capability of the portable device 3.

(2) To improve the radio wave transmission intensity of the RF transmitting antenna 18, the layout of a pattern antenna may be varied to form the clearance 39 and the clearance 40. Accordingly, the radio wave intensity of the RF transmitting antenna 18 may be increased through a simple modification of the pattern antenna.

(3) The RF transmitting antenna 18 (pattern antenna) is laid out along the side 31b, which differs from the side 31a of the substrate 27 that is closest to the lock switch 25 and unlock switch 26 of the portable device 3. Thus, when the user grips the portable device 3 and operates the lock switch 25 or unlock switch 26, the finger operating the switch 25 or 25 or the fingers holding the portable device would not block the RF transmitting antenna 18. This prevents intensity attenuation of the radio waves generated by the portable device 3 that may occur if the RF transmitting antenna 18 were to be blocked by the user's fingers. Accordingly, the layout of the RF transmitting antenna 18 is effective for ensuring a high wireless communication capability.

(4) The clearance 40 is formed along a planar direction of the substrate 27 in the RF transmitting antenna 18. Radio waves are directed in a direction passing through the clearance 40. Thus, the radio waves are transmitted in a direction perpendicular to the substrate 27 (i.e., the direction of the Y axis in FIG. 3).

It should be apparent to those skilled in the art that the present invention may be embodied in many other specific forms without departing from the spirit or scope of the invention. Particularly, it should be understood that the present invention may be embodied in the following forms.

Figure 6A:
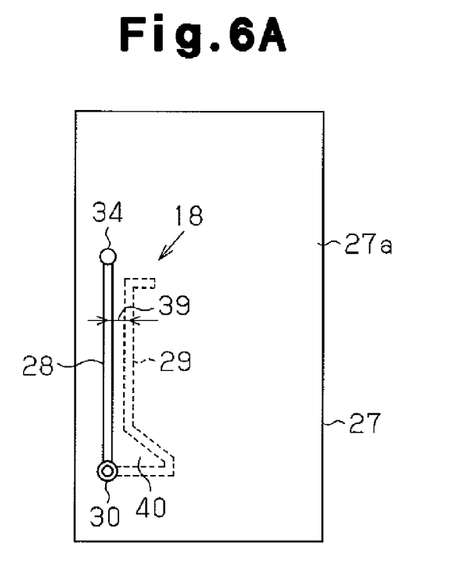
FIGS. 6A to 6D are plan views showing substrates in other examples.

The clearance 40 does not necessarily have to be formed by the first and second surface patterns 28 and 29. For example, referring to FIG. 6A, the clearance 40 may be formed on only one of the first and second surfaces 27a and 27b of the substrate 27 (the second surface 27b of the substrate 27 in FIG. 6A).

Figure 6B:
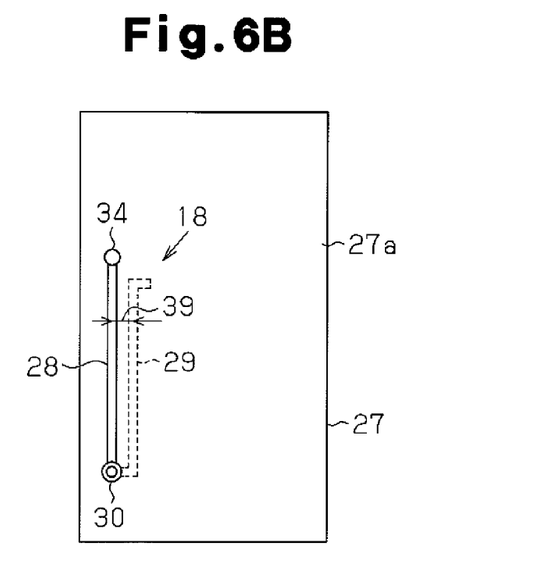
Figure 6C:
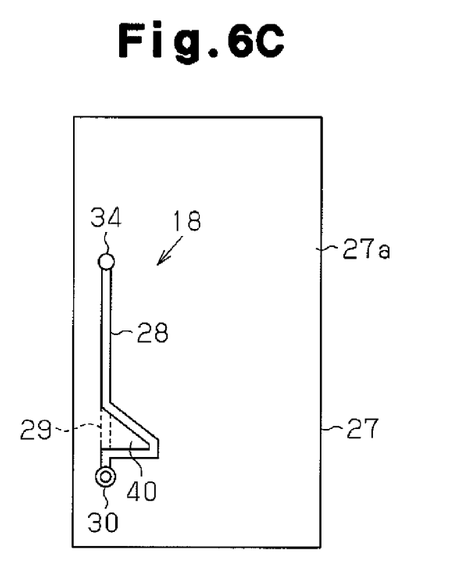

The clearances 39 and 40 both do not necessarily have to be included in the RF transmitting antenna 18. For example, as shown in FIG. 6B, the RF transmitting antenna 18 may be formed to include only the clearance 39. Alternatively, as shown in FIG. 6C, the RF transmitting antenna 18 may be formed to include only the clearance 40. In such a case, the clearance 40 does not have to be located at one end of the first pattern portion 32 and may be located at any position, such as an intermediate position in a pattern portion.

Figure 6D:
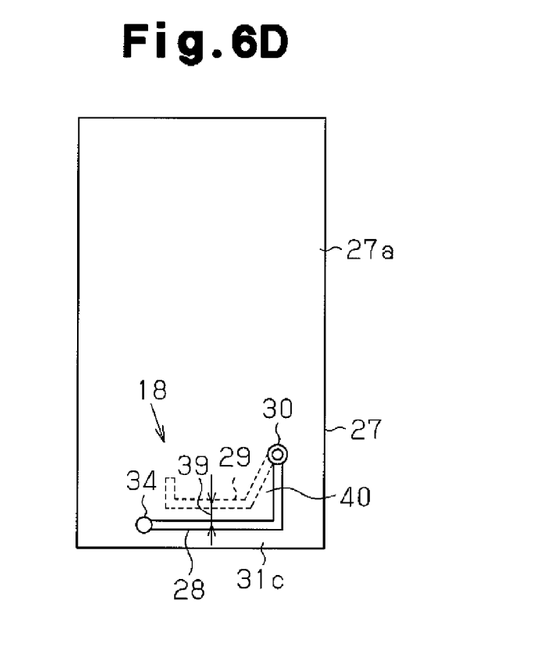

The RF transmitting antenna 18 is formed on the substrate 27, which is a flat and rectangular plate, and laid out along a long side of the substrate 27. However, the layout of the REF transmitting antenna 18 is not limited in such a manner. For example, as shown in FIG. 6D, the RF transmitting antenna 18 may be laid out along a short side 31c of the substrate. In any case, the location of the RF transmitting antenna is not limited in any manner.

The RF transmitting antenna 18 is not limited to a two-axis antenna that transmits radio waves in two axial directions. For example, the RF transmitting antenna 18 may be a three-axis antenna that transmits radio waves in the direction of three axes or a single-axis antenna that transmits radio waves in the direction of a single axis.

When the RF transmitting antenna 18 is a two-axis antenna, the directions in which radio waves are directed are not limited to the X axis direction and the Y axis direction. The radio waves may be directed in any combination of directions.

The portable device 3 (substrate 27) does not necessarily have to be rectangular and may be, for example, square or circular.

The application of the hands-free system is not limited to a vehicle 1. For example, the hands-free system 2 may be applied to a door lock device for a house. In any case, the hands-free system may be applied to any subject.

The pattern antenna laid out on the two surfaces of the substrate 27 does not have to be a transmitting antenna and may be a receiving antenna.

The hands-free system 2 when used to lock and unlock a vehicle door may function such that it automatically unlocks the door when the portable device 3 approaches the vehicle 1 and automatically locks the door when the portable device 3 moves away from the vehicle 1.

The hands-free function and the remote control function both do not have to be included in the portable device 3. The portable device 3 may be provided with only one of these functions.

The present examples and embodiments are to be considered as illustrative and not restrictive, and the invention is not to be limited to the details given herein, but may be modified within the scope and equivalence of the appended claims.

What is claimed is:

1. An antenna structure for a wireless communication device including a substrate having a predetermined thickness, a first surface that supports an electronic component, and a second surface opposite to the first surface, the antenna structure comprising:
    a first surface pattern formed on the first surface of the substrate and including two ends, one of which is connected to a power supply point and the other of which is connected to a through hole; and
    a second surface pattern formed on the second surface of the substrate and including two ends, one of which is connected to a ground point and the other of which is connected to the through hole, wherein the second surface pattern and the first surface pattern are connected to each other by the through hole so as to form a loop antenna, the second surface pattern is at least partially separated from the first surface pattern in a direction perpendicular to a thicknesswise direction of the substrate so that the second surface pattern and the first surface pattern are in a nonoverlapping state in the thicknesswise direction, and wherein the first surface pattern and the second surface pattern each include a straight pattern portion, with the straight pattern portions of the first and second surface patterns being spaced apart from each other in the direction perpendicular to the thicknesswise direction of the substrate in a non-overlapping state so as to form a clearance; and
    the first surface pattern and the second surface pattern each include a further pattern portion extending from the straight pattern portion, with the further pattern portions of the first and second patterns being spaced apart from each other so as to form a clearance that is wider in the direction perpendicular to the thicknesswise direction of the substrate than the clearance between the straight portions.

2. The antenna structure according to claim 1, wherein the second surface pattern at least partially extends parallel to the first surface pattern at a location separated from the first surface pattern in the direction perpendicular to the thicknesswise direction of the substrate.

3. The antenna structure according to claim 1, wherein the second surface pattern at least partially extends inclined at an acute angle relative to the first surface pattern.

4. The antenna structure according to claim 1, wherein:
    the first surface pattern includes a first pattern portion and a second pattern portion extending from the first pattern portion at a generally right angle; and
    the second surface pattern includes a third pattern portion, which is connected to the second pattern portion of the first surface pattern, and a fourth pattern portion, which extends from the third pattern portion, with the third pattern portion extending inclined at an acute angle relative to the second pattern portion, and the fourth pattern portion extending parallel to the first pattern portion at a location separated from the first pattern portion in the direction perpendicular to the thicknesswise direction of the substrate.

5. The antenna structure according to claim 1, wherein:
    the first surface pattern includes a first pattern portion; and
    the second surface pattern includes a second pattern portion, which is connected to the first pattern portion of the first surface pattern, a third pattern portion, which extends from the second pattern portion, and a fourth pattern portion, which extends from the third pattern portion, with the second pattern portion extending at a generally right angle relative to the first pattern portion, the third pattern portion extending inclined at an acute angle relative to the second pattern portion, and the fourth pattern portion extending parallel to the first pattern portion at a location separated from the first pattern portion in the direction perpendicular to the thicknesswise direction of the substrate.

6. The antenna structure according to claim 1, wherein the first surface pattern includes a first pattern portion and a second pattern portion extending from the first pattern portion, with the second pattern portion extending inclined at an acute angle relative to the first pattern portion.

7. The antenna structure according to claim 1, wherein the first and second surface patterns are formed near one side of the substrate.

8. A wireless key for performing wireless communication with a communication subject, the wireless key comprising:
    an operation unit which generates a wireless signal when operated by a user;
    a substrate which is connected to the operation unit and which supports an electronic component;
    an antenna which is printed onto the substrate and which is capable of transmitting the wireless signal;
    wherein the substrate includes a predetermined thickness, a first surface that supports the electronic component, and a second surface opposite to the first surface; and
    the antenna includes:
    a first surface pattern formed on the first surface of the substrate and including two ends, one of which is connected to a power supply point and the other of which is connected to a through hole; and
    a second surface pattern formed on the second surface of the substrate and including two ends, one of which is connected to a ground point and the other of which is connected to the through hole, wherein the second surface pattern and the first surface pattern are connected to each other by the through hole so as to form a loop antenna, with the second surface pattern at least partially separated from the first surface pattern in a direction perpendicular to a thicknesswise direction of the substrate so that the second surface pattern and the first surface pattern are in a nonoverlapping state in the thicknesswise direction, and wherein the first surface pattern and the second surface pattern each include a straight pattern portion, with the straight pattern portions of the first and second surface patterns being spaced apart from each other in the direction perpendicular to the thicknesswise direction of the substrate in a non-overlapping state so as to form a clearance: and the first surface pattern and the second surface pattern each include a further pattern portion extending from the straight pattern portion, with the further pattern portions of the first and second patterns being spaced apart from each other so as to form a clearance that is wider in the direction perpendicular to the thicknesswise direction of the substrate than the clearance between the straight portions.

9. The wireless key according to claim 8, wherein the antenna is formed on the substrate at a location separated from the operation unit.

10. The wireless key according to claim 8, wherein the second surface pattern at least partially extends parallel to the first surface pattern at a location separated from the first surface pattern in the direction perpendicular to the thicknesswise direction of the substrate.

11. The wireless key according to claim 8, wherein the second surface pattern at least partially extends inclined at an acute angle relative to the first surface pattern.

12. The wireless key according to claim 8, wherein:

the first surface pattern includes a first pattern portion and a second pattern portion extending from the first pattern portion at a generally right angle: and the second surface pattern includes a third pattern portion, which is connected to the second pattern portion of the first surface pattern, and a fourth pattern portion, which extends from the third pattern portion, with the third pattern portion extending inclined at an acute angle relative to the second pattern portion, and the fourth pattern portion extending parallel to the first pattern portion at a location separated from the first pattern portion in the direction perpendicular to the thicknesswise direction of the substrate.

13. The wireless key according to claim 8, wherein the first and second surface patterns are formed near one side of the substrate.

* * * * *